US012563272B1

(12) United States Patent
Vakharia et al.

(10) Patent No.: US 12,563,272 B1
(45) Date of Patent: Feb. 24, 2026

(54) FOREVER SAVES SYSTEM AND METHOD

(71) Applicant: SymphonyOS Inc., Los Angeles, CA (US)

(72) Inventors: Megh Vakharia, Los Angeles, CA (US); Chuka Nnodim-Amadi, Los Angeles, CA (US); Jose Miguel Gonzalez Velazquez, Los Angeles, CA (US)

(73) Assignee: SymphonyOS Inc., Los Angeles, CA (US)

( * ) Notice: Subject to any disclaimer, the term of this patent is extended or adjusted under 35 U.S.C. 154(b) by 179 days.

(21) Appl. No.: 18/209,078

(22) Filed: Jun. 13, 2023

(51) Int. Cl.
　　*H04N 21/63*　　(2011.01)
　　*H04N 21/45*　　(2011.01)
　　*H04N 21/6334*　　(2011.01)
(52) U.S. Cl.
　　CPC ..... *H04N 21/6334* (2013.01); *H04N 21/4524* (2013.01)

(58) Field of Classification Search
None
See application file for complete search history.

(56) References Cited

U.S. PATENT DOCUMENTS

2003/0020744 A1* 1/2003 Ellis ................... H04N 21/4782
　　　　　　　　　　　　　　　　348/E7.063
2013/0111512 A1* 5/2013 Scellato ............... H04N 21/252
　　　　　　　　　　　　　　　　725/14

* cited by examiner

*Primary Examiner* — Cai Y Chen
(74) *Attorney, Agent, or Firm* — Manatt, Phelps & Phillips, LLP

(57) ABSTRACT

A forever saves system and method for content producers (e.g., artists or studios or publishers) and their fans allows a fan to subscribe to forever saves so that any new releases from a particular content producer is automatically detected and provided to the fan.

24 Claims, 7 Drawing Sheets

40

60

62

64

FOREVER SAVES SYSTEM AND METHOD

FIELD

The disclosure relates to a system and method for automatic tracking and streaming of new content, such as songs or albums, by a content provider, such as an artist.

BACKGROUND

Systems and services exist that allow a user/fan to pre-order & pre-save a song or album from an artist. For example, Apple® Music allows a user to log into the service, search for an artist, song, album or new releases and, for a song or album not yet released, and pre-add the song or album so that the song or album is delivered to the user/fan library once the song/album has been released. Other music services, such as Deezer or Spotify, offer similar features, but also require the log in and search to be performed by the fan.

The limitations of these known pre-save features are two-fold. First, a fan may miss a new song or album by the artist unless the fan is constantly logging into and searching each platform for new releases which is very cumbersome. The missed song or album means that the artist and the recording company may lose revenue for the sale and streaming of the new song or album that would otherwise happen but for the fan not being aware of the new song or album. This creates friction for the fan and makes it more difficult for the fan to follow particular artists. Second, the artist with the new song or album may lose a chance to interact with the fan and promote the new song or album to the fan. The artist could lose a fan who becomes disgruntled with the fact that the fan was not made aware of the new song or album.

Another problem is that the fan may be subscribed to multiple different music services and thus receive and pay for the same song multiple times leading to a poor fan experience. Like above, this poor fan experience may result in the artist losing a fan. For the artist, it can be time consuming to manage each of the streaming services on which an album or song or other content may be released. Furthermore, the poor user experience for the fan reflects poorly on the artist.

Thus, it is desirable to provide a forever saves feature that addresses the fan and artist issues, and it is to this end that the disclosure is directed.

DETAILED DESCRIPTION OF ONE OR MORE EMBODIMENTS

The disclosure is particularly applicable to a system and method for forever saves of music content (song and/or album) from a particular artist (musician) and it is in this context that the disclosure will be described. It will be appreciated, however, that the system and method has greater utility since it may be used for different types of content, such as videos, audio books, books, podcast, applications, games, etc. and it may be used alternatively to select a piece of content from various sources of the content such as a production company, a recording label, etc.

For this disclosure, the term "content" will be used to refer to any piece of content that may be automatically ordered and purchased using a forever saves feature and may include, for example, a song, an album, a video, an audio books, a book (electronic or paper), a podcast, an application, a game, etc. Furthermore, the term "content provider" will be used to refer to an entity (person, company, etc.) that has the ability to sell the content to the user and may include, for example, an artist, a production company, a recording label, a talent and the like.

Figure 1:
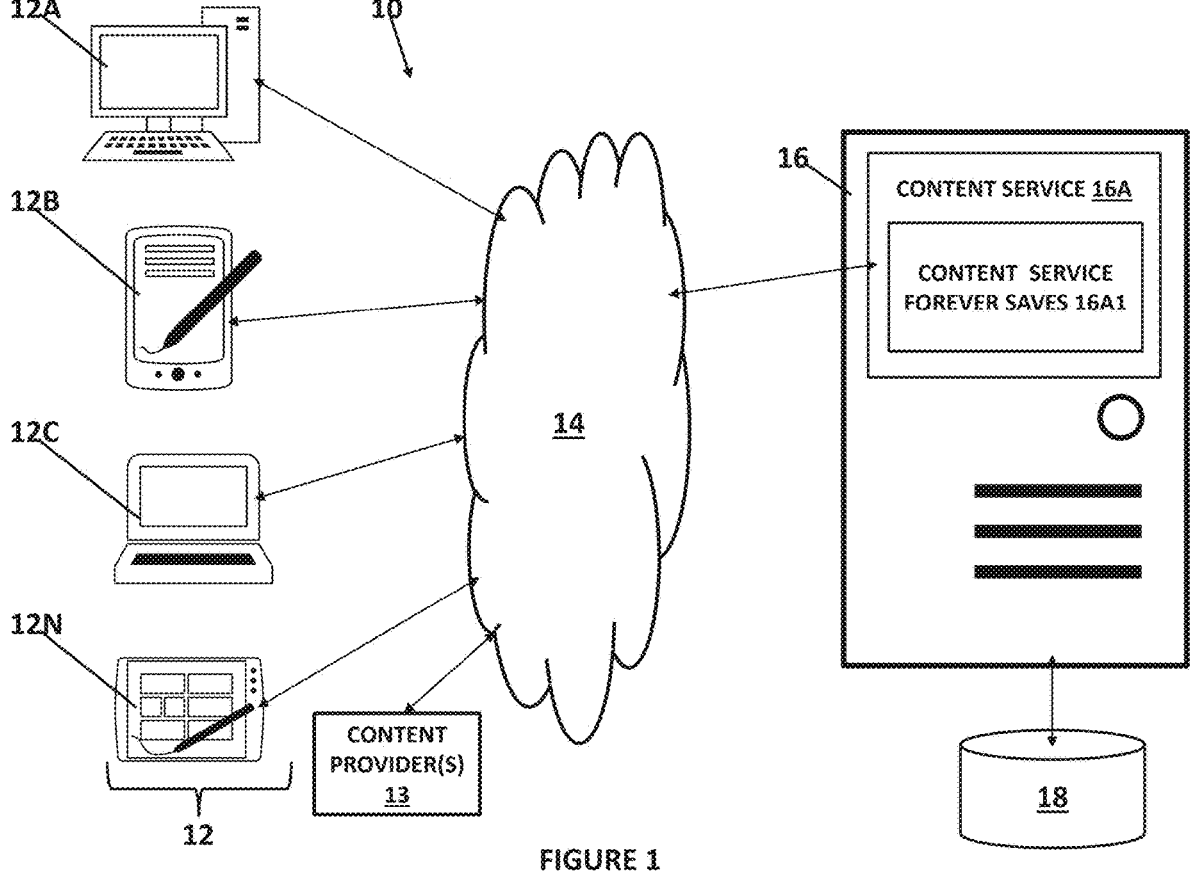
FIG. 1 is a block diagram of a content system that may include a forever saves feature.

FIG. 1 is a block diagram of a content system 10 that may include a forever saves feature wherein a user may use a computing device 12 to communicate over a communications path 14 with a backend 16 to automatically order each song or album from a particular content provider when the song or album becomes available for purchase without having a manually check each content service, such as for example Spotify®, Apple® Music, and/or Deezer for music streaming services, and pre-order each song and/or album. The system may also include one or more content providers 13 that use the backend 16 to promote their content, to interact with fans and manage their content. Furthermore, the backend 16 may generate metrics and data visualizations that assist the content provider to manage their content as discussed below. In one exemplary implementation, the content provider is a musician who is managing their albums and songs being released to their fans.

Each user/fan and each content provider may use the computing device 12 (one or more computing devices 12 for one or more users/fans and content providers) to connect to and interact with the backend 16 over the communication path 14. Each computing device may have a processor, memory, a display and communication circuits (WiFi, cellular, Bluetooth, Ethernet, etc.). For example, each computing device 32 may be a personal computer 32A, a smartphone device 32B (such as an Apple® iPhone® or Android® operating system-based device), a laptop computer 32C, and/or a tablet computer 32N. Each computing device 12 may execute a known browser application (and generates web pages) or use an API to communicate with the backend 16.

The communication path 14 may be a wired or wireless network (or a combination of both) that use data and communication protocols for the connection and communication of each computing device 12 with the backend system 16. Each piece (or the entire communication path) may be wired (ethernet, DSL, cable, etc.) or wireless (digital computer network, cellular data network, WiFi, LAN, WAN, etc.). The system 10 in FIG. 1 can operate with any communication path.

The backend 16 may be one or more computing resources (cloud computing resources, a server, a processor, memory, database, etc.) that execute a plurality of lines of instructions by a processor of the backend 16 to implement a content service 16A that manages the content of the content provider. In one exemplary embodiment, the content provider is a musician and the content service 16A is a music content services that manages the songs and albums and fan interactions. The content service 16A may have a content service forever saves engine 16A1 that is implemented as a plurality of lines of instructions executed by a processor of the backend system 16. The content service forever saves engine 16A1 implements a forever saves feature that allows a fan to sign up to receive any new release of the content provider (such as a song or album from a particular artist in the exemplary embodiment) when it is available and then have the new release automatically downloaded/streamed to the fan. The forever saves feature has technical features that avoids the user having to check various services for new releases, provides metrics to the content provider and manages the content of the content provider as discussed below in more detail. The backend 16 may be coupled to a store 18 (hardware or software) that stores the data and instructions used by the system.

A content provider may set up a forever saves feature using a "create a Pre-save" marketing flow using the content system. As part of this process, the content provider, such as an artist or musician, may customize their presave website (look and feel) and, on a "details" page, the content provider can opt-in to Forever Saves, which is enabled by default in one embodiment. Once the content provider finishes setting up their Pre-save, the content system provides the content provider with a link which includes the webpage for the pre-save, such as this: https://symphony.to/sza-1/new-release that can be provided to fans of the content provider so that, when fans pre-save on that webpage, the content system will automatically opt users, who consent, into Forever Saves for the content provider.

A fan may interact with the content system by a fan clicking on the artist's pre-save URL that directs the fan to a web page. When the fan lands on that webpage for forever saves, the fan sees the option to pre-save on Spotify, and optionally Deezer and/or Apple Music depending on the content services to which the fan is subscribed. When the fan clicks on one of the streaming services, the fan authenticates themselves with that service (e.g., provide user access tokens as discussed below), and once authenticated, a pre-save success page is displayed to the fan. At that point in time, the content system's API stores the Fan in the Fan database, and ties the song release, to the Fan's ID using a FanSaves table. The fan will see an option to "Subscribe" to an artist's release, with an email input box. If the user enters their email address and hits "Subscribe", their email address is stored in content system's database under the user's Fan id. When the song/album eventually releases, the content system's scheduled server jobs will check for all of the Fans who pre-saved the release, and initiate the saving process into each fan's music library based on their selected streaming service.

Figure 2:
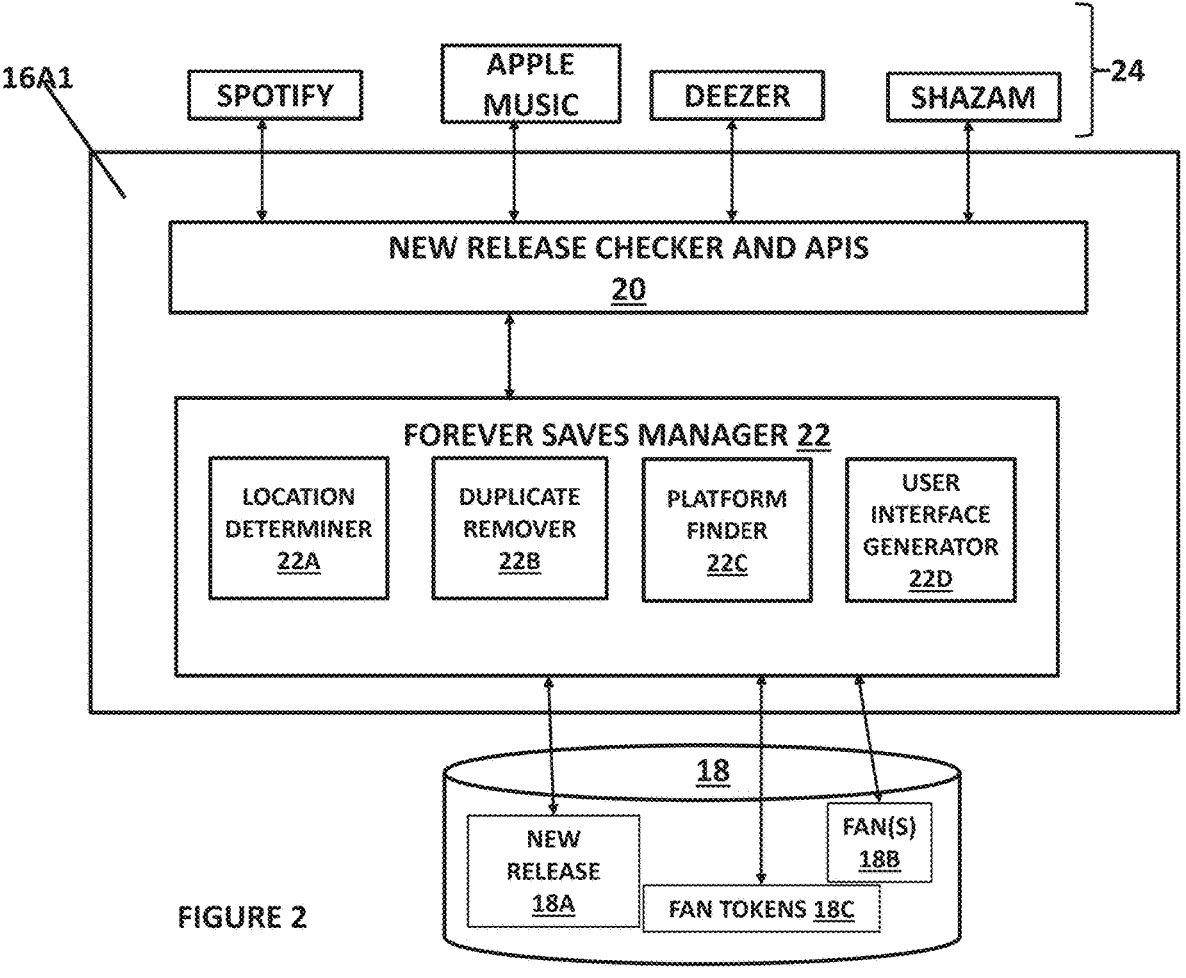
FIG. 2 illustrates an example of a hardware implementation of the content system with the forever saves feature.

FIG. 2 illustrates an example of a hardware implementation of the content system 16A1 with the forever saves feature. This implementation will be described in the context of the exemplary music service and its interactions with one or more fans and one or more musicians. The content system with forever saves 16A1 may interface with one or more content services 24 that stream/download content (with examples in the streaming music example being Spotify®, Apple® Music or Deezer®) and/or identify content being played (with Shazam® being the example in the music context).

The content system with forever saves 16A1 may include a new release checker and API module 20 that interfaces with the content services 24 to check for new releases and download/stream any new releases for a particular artist/content provider to each fan who forever saved the artist/content provider and capture data about each time a piece of content is identified while being played. In one embodiment, the connections and interactions with each content service 24 may be using well-known application programming interfaces (APIs). The content system with forever saves 16A1 may further include a forever saves manager 22 that is connected to the new release checker and API module 20. The manager 22 may include a location determiner 22A, a duplicate remover 22B, a platform finder 22C and a user interface generator 22D that manage the content, new releases and metrics for the content provider. The location determiner 22A may determine, the first time a user subscribes to forever saves, a geographic location of the fan that may be used to generate the metrics for the content provider. The duplicate remover 22B checks to see if a new release is a duplicate to any content already stored in the store 18 and cancels the new release if it is a duplicate. The platform finder 22C may access and search each content service 20. The user interface generator 22D may generate the various metrics for content to each content provider as well as the fan/user interfaces for the forever saves feature. Examples of these metrics (metrics about a new release and metrics about the countries and cities in which fans are forever saving new releases) are discussed below in more detail with reference to FIGS. 5-6.

In the example shown in FIG. 2, the manager 22 may also be coupled to the store 18 that stores one or more new releases of content 18A, data about one or more fans 18B and data about one or more access tokens 18C for each fan. A new release may be stored in the store 18 as a new release record 18A when the new release checker 20 determines that a new release has occurred that is not a duplicate. The data about each fan 18B may include data about the content providers likes by each fan, a current library of content of the user and if the user has signed up for the forever saves feature for each/any content providers. The tokens 18C for each fan are gathered from the fan and allow the new release checker 20 to access each content service 24, check for new releases and download/stream any new releases to the library of the user if the fan has subscribed to the forever saves feature for the particular content provider.

Figure 3:
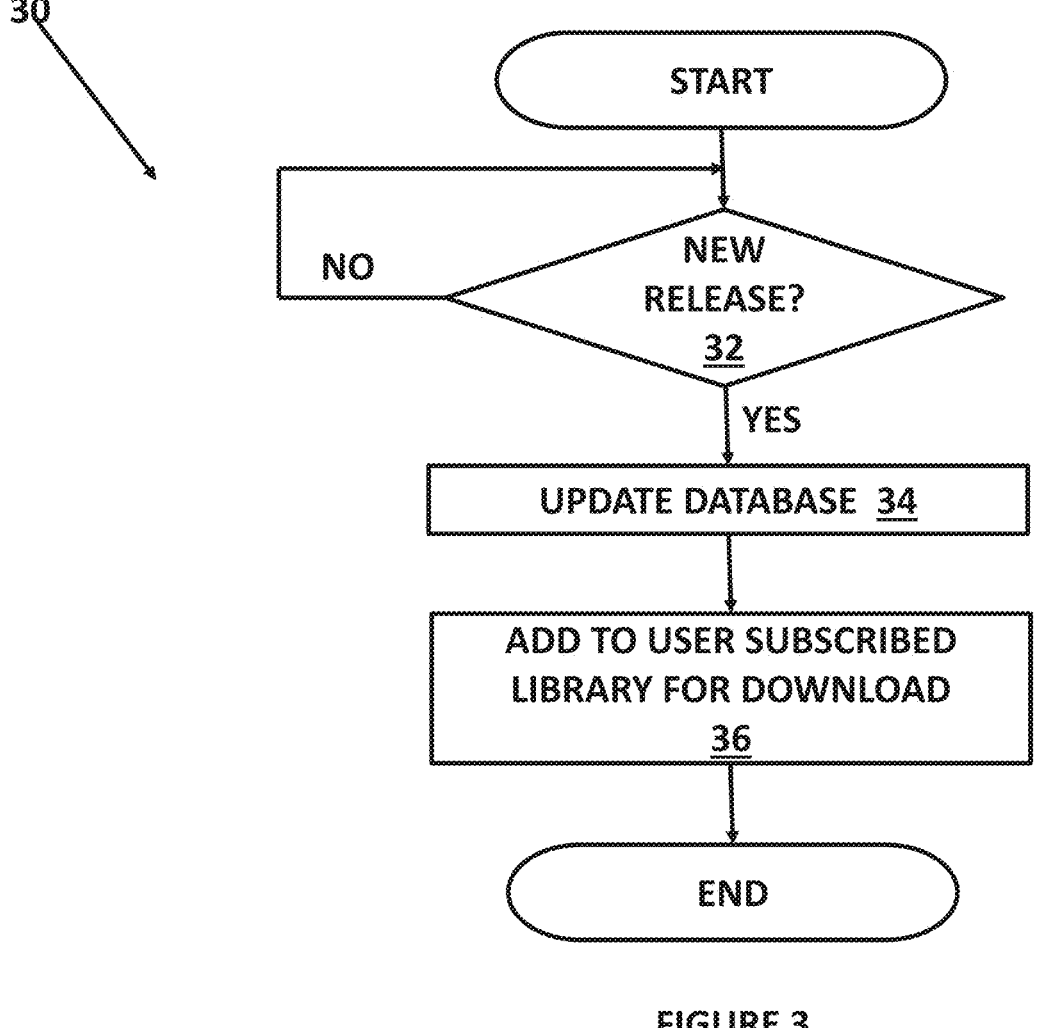
FIG. 3 illustrates a method for automatically scanning for forever saves releases of content using the system having the forever saves feature.

FIG. 3 illustrates a method 30 for automatically scanning for new forever saves releases of content using the system having the forever saves feature for each content provider. The method 30 may be performed by the system shown in FIGS. 1 and 2, but may also be implemented in other manners that are within the scope of the disclosure. The forever saves method occurs when a fan signs up for forever saves for content, such as a song or an album, from a particular content provider, such as a musician, so that the user does not, for example, need to log into each content service 24 and conduct a search and then pre-order an album or track. Furthermore, the forever saves system avoid a fan from pre-saving a song or album from several different content providers and thus paying multiple times for each song or album. When a fan has signed up for forever saves for a particular artist (for any and all future content by the content provider), the method checks each content provider, such as a music streaming service, for any new releases (32). The forever saves service may periodically and automatically check for new releases for the particular content provider. For example, the forever saves service may log into (using the fan tokens as discussed below) each content provider, such as various different streaming music providers as shown in FIG. 2, and automatically check for new releases every predetermined amount of time, such as once per day, once per hour, once every 6 hours, etc. If no new release is detected for any content provider, the method loops back and checks, any the time period expiry, again for the new release.

If a new release for the content provider is detected on a particular content service 24, the method may update its database (34) to add the new release into that database. The updating of the database allows the system to remove duplicate new releases from the different content services. For each fan/user that is subscribed to the forever saves for the particular content provider who created the new release, the method adds the new song record to each forever saves subscribed fan/user's content library (36), such as a music library. During these processes, the method also downloads/streams the new release and stored it in its database so that the new release can be distributed to each fan/user who is subscribed to forever saves for the particular content provider. In the music content example, a user/fan can subscribe to one or more musicians and thus automatically receive any new song or album release from each musician when it becomes available without having to pre-save the new release on multiple content services.

Figure 4A:
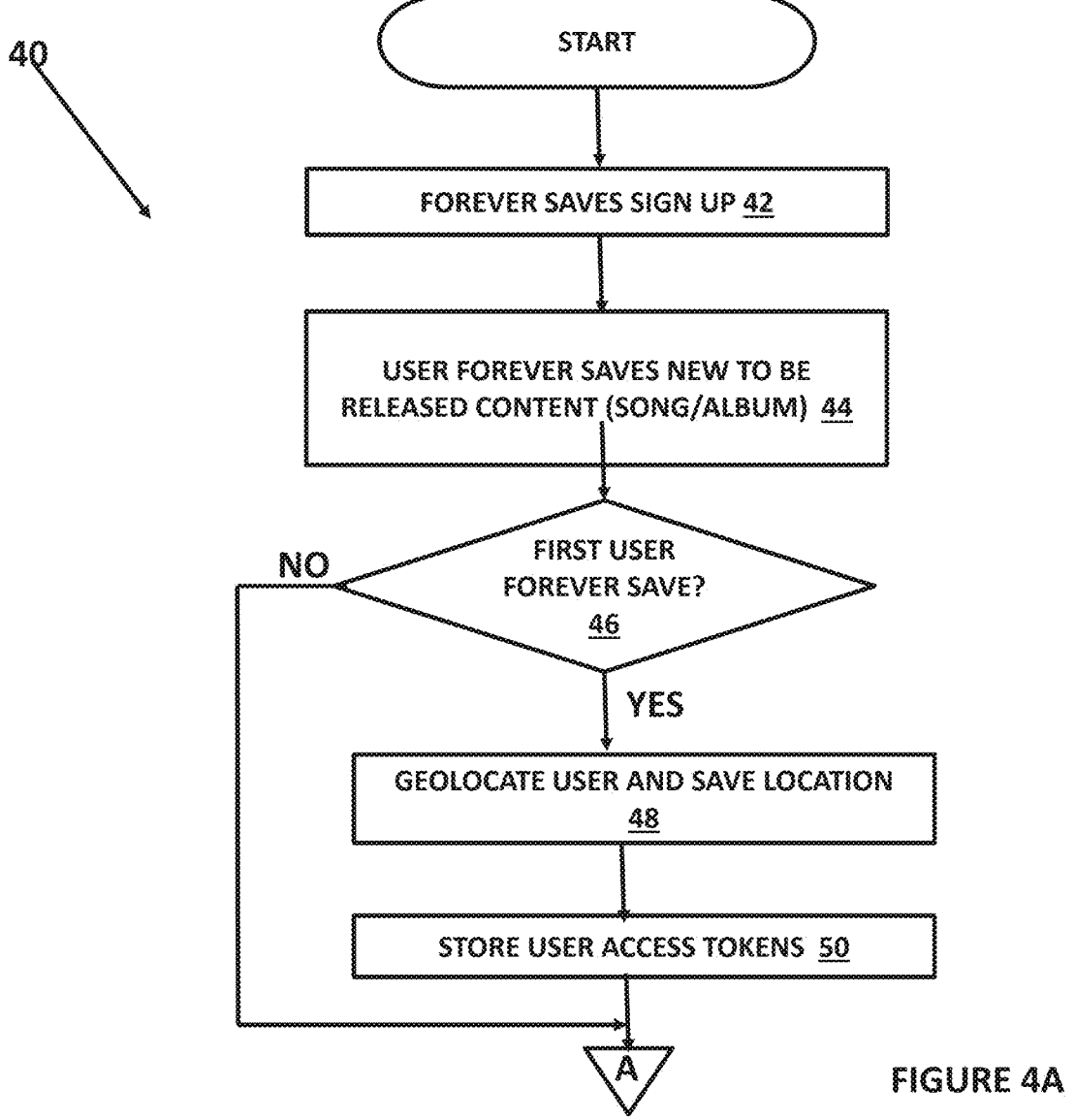
FIGS. 4A and 4B illustrates a forever saves method.
Figure 4B:
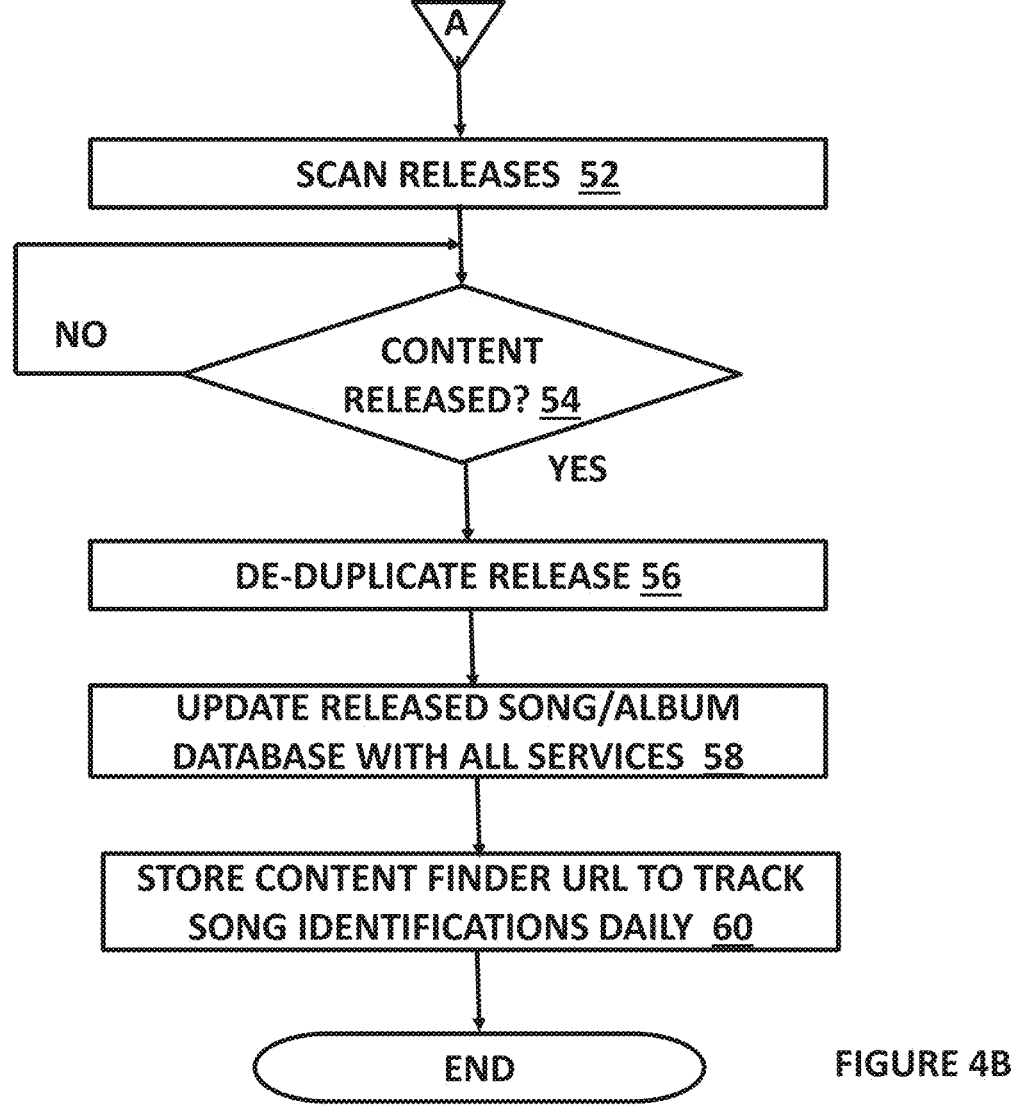
Figure 6:
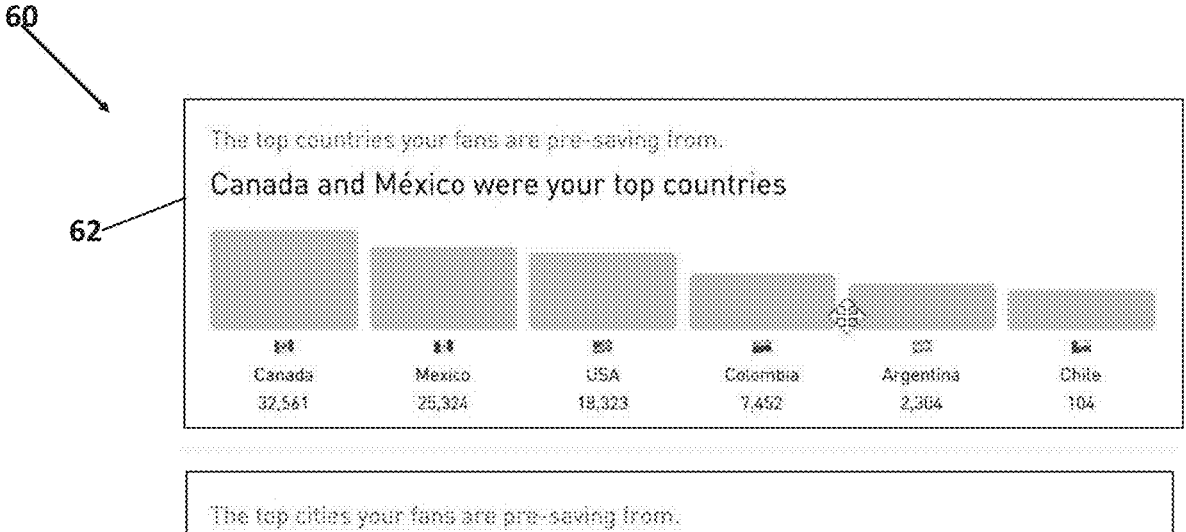
FIG. 6 illustrates an example of a user interface generated by the system with metrics about the countries and cities in which fans are forever saving new releases.
Figure 6:

FIGS. 4A and 4B illustrates a forever saves method 40 for a fan/user that has signed up for a particular content provider. The method 30 may be performed by the system shown in FIGS. 1 and 2, but may also be implemented in other manners that are within the scope of the disclosure. In the method, a user/fan may sign up for forever saves for a particular content provider (42) so that the user/fan receives any and all new releases for the content provider (44). The method then checks to determine if the forever saves is the first instance (46) for the user/fan. If the most recent forever saves is a first for a particular user/fan, the method determines the location of the user/fan (48) such as based on a location associated with the IP address (reverse geolocate the user IP address, for example) and stores that location in the database in the particular fan/user's data record. The location of the user/fan may be used to generate the metrics (examples of which are shown in FIG. 6) for the content provider about the forever saves. For a new forever saves user/fan, the method may also gather and store user access tokens (50), such as a user token and refresh token, for each content service 24 that may be used to track the content services used by the particular user/fan and to perform the forever saves processes like checking for new releases and downloading/streaming new releases.

The method, whether the user/fan is new to forever saves or has used forever saves previously, may scan each of the content services for new releases (52). In one embodiment, the method may scan Spotify each hour for all artists with at least one fan subscribed to forever saves for that artist. The method then determines, for each content provider, if the content has been released (54) periodically and loops back to check again periodically if no new release has been detected. If a new release has been found, the method may de-duplicate the new release (56) meaning that the method removes duplicates of the new release such as a from the different content services.

The method may then use the content unique identifier (such as UPC or ISRC for a song or album in the music example) to automatically find a link to the content on each content service (58) so that the links for each of the content services for each new release is stored in the database. The links may be used by the content provider of the new release to generate his/her website for the release more easily. The method may also, using the identifier, stores a link to a service (60), such as Shazam for music, which tracks when its users use the service to identify the piece of content. The method may then obtain a number of identifications of the content on a daily basis that may be reported to the content provider.

Figure 5:
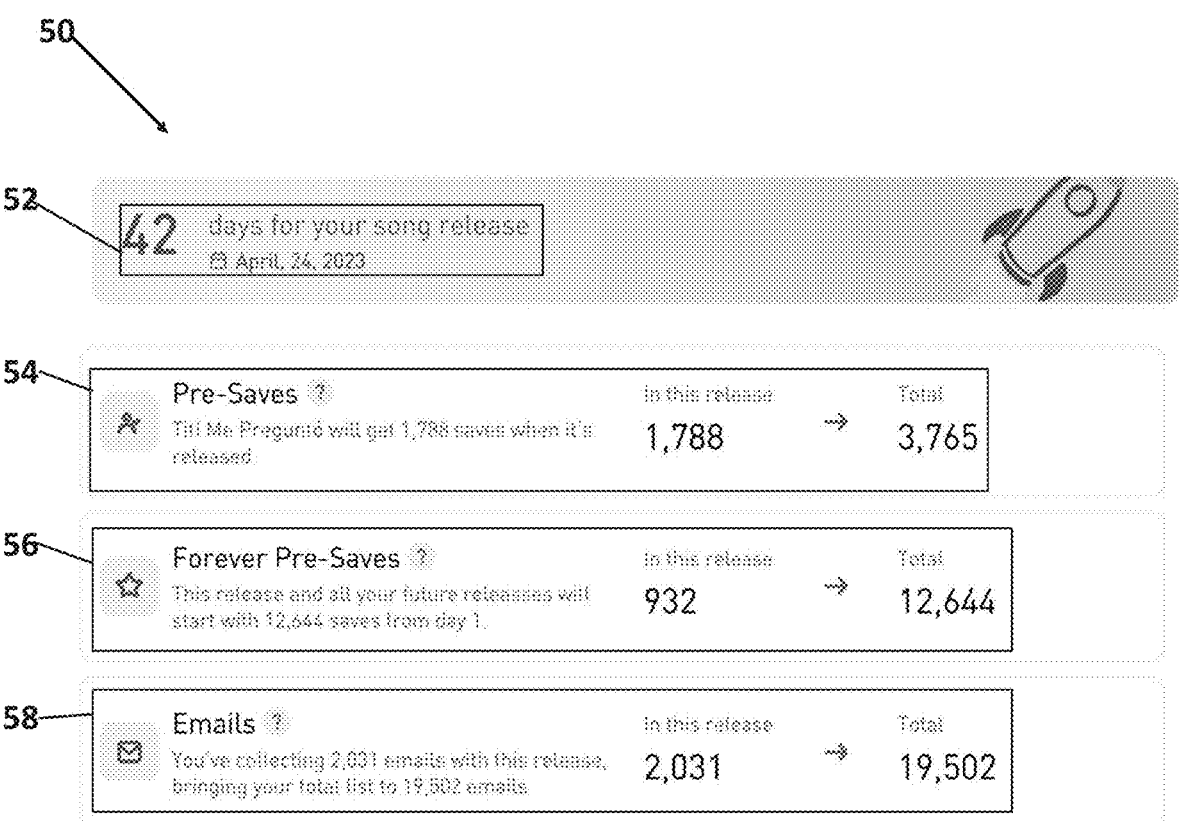
FIG. 5 illustrates an example of a user interface generated by the system with metrics about a new release.

FIG. 5 illustrates an example of a user interface 50 generated by the system with metrics about a new release. The user interface provides the content provider with a quick glance at each new release metrics is continuously updated as new data about the new release becomes available. The user interface may include a time period portion 52 that shows the time period (days in one example) of the release of the new piece of content (a song in this example). The user interface may further include a pre-saves portion 54 that displays a number of pre-saves for the particular release and the total number of pre-saves for the content provider and a forever pre-saves portion 56 that shows the forever pre-saves for the particular piece of content and then a total number of saves based on forever saves for the content provider. The user interface also may have an email portion 58 that displays the emails received by the content provider for the current new release and the total number of emails received by the content provider for all releases using the system.

FIG. 6 illustrates an example of a user interface 60 generated by the system with metrics about the countries and cities in which fans are forever saving new releases. The user interface may include a country pre-save metric 62 that shows, using bar graphs, the relative number of pre-saves in each country (and the exact number as well) and a cities pre-saves metric 64 that shows using bar graphs, the relative number of pre-saves in each country (and the exact number as well). The metrics shown in FIG. 6 may be generated based in part of the location determiner 22A determines a geographic location for each fan that has subscribed to the forever saves feature.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers, In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, micropro-cessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instruc-tions including program modules, executed in association with such components or circuitry, for example. In general, program modules may include routines, programs, objects, components, data structures, etc. that perform particular tasks or implement particular instructions herein. The inven-tions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Fur-ther, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Alternatively, the mod-ules can comprise programming instructions transmitted to a general-purpose computer or to processing/graphics hard-ware via a transmission carrier wave. Also, the modules can be implemented as hardware logic circuitry implementing the functions encompassed by the innovations herein. Finally, the modules can be implemented using special purpose instructions (SIMD instructions), field program-mable logic arrays or any mix thereof which provides the desired level performance and cost.

As disclosed herein, features consistent with the disclo-sure may be implemented via computer-hardware, software, and/or firmware. For example, the systems and methods disclosed herein may be embodied in various forms includ-ing, for example, a data processor, such as a computer that also includes a database, digital electronic circuitry, firm-ware, software, or in combinations of them. Further, while some of the disclosed implementations describe specific hardware components, systems and methods consistent with the innovations herein may be implemented with any com-bination of hardware, software and/or firmware. Moreover, the above-noted features and other aspects and principles of the innovations herein may be implemented in various environments. Such environments and related applications may be specially constructed for performing the various routines, processes and/or operations according to the inven-tion or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combina-tion of hardware, software, and/or firmware. For example, various general-purpose machines may be used with pro-grams written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field pro-grammable gate arrays ("FPGAs"), programmable array logic ("PAL") devices, electrically programmable logic and memory devices and standard cell-based devices, as well as application specific integrated circuits. Some other possi-bilities for implementing aspects include memory devices, microcontrollers with memory (such as EEPROM), embed-ded microprocessors, firmware, software, etc. Furthermore, aspects may be embodied in microprocessors having soft-ware-based circuit emulation, discrete logic (sequential and combinatorial), custom devices, fuzzy (neural) logic, quan-tum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteris-tics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method for forever saves of content, the method comprising:
   retrieving, a forever saves selection of a fan for a particular content provider from a database of a computer based forever saves system, the forever saves selection indicating an interest in a purchase of any new releases of content created by the particular content provider;
   accessing, periodically in an automatic manner by the computer based forever saves system, a plurality of content services using an application programming interface (API) and user access tokens for each content service, wherein each content service is configured to release a plurality of new content for the particular content provider;
   determining, by the computer based forever saves system, that a new release of content created by the particular content provider has been released by a particular content service;
   purchasing, in an automatic manner from the particular content service using the API and user access tokens for the particular content service, the determined new release of content created by the particular content provider; and
   delivering, in an automatic manner by the computer based forever saves system, the purchased new release of content created by the particular content provider to a content library of the fan.

2. The method of claim 1 further comprising obtaining, by the computer based forever saves system, one or more access tokens of the fan to access each content service and wherein accessing each content service further comprises using the obtained one or more fan access tokens to access each of the plurality of content services.

3. The method of claim 2 further comprising determining, by the computer based forever saves system, a location of the fan.

4. The method of claim 3, wherein determining the location of the fan further comprises performing, by the computer based forever saves system, a reverse geolocation using an IP address of the fan.

5. The method of claim 3 further comprising generating, by the computer based forever saves system, metrics about the new release using the location of the fan.

6. The method of claim 1 further comprising verifying, by the computer based forever saves system, that the new release is not a duplicate of content already obtained by the computer based forever saves system.

7. The method of claim 1 further comprising obtaining, by the computer based forever saves system, a link to the new release for each content service other than the particular content service.

8. The method of claim 1 further comprising obtaining, by the computer based forever saves system, a number of content identification lookups by a content identification lookup service for the new release.

9. The method of claim 1, wherein the content is one of music, movies and books.

10. The method of claim 1, wherein the content is music, the content provider is an artist and the plurality of content services are Apple® Music, Deezer® and Spotify®.

11. A system for forever saves of content, the system comprising:
   a computing device of a fan that selects a forever saves for a particular content provider, the forever saves selection indicating an interest in a purchase of any new releases of content created by the particular content provider;
   a computer based forever saves system having a processor and a memory and a plurality of lines of instructions so that the computer based forever saves system is configured to:
   retrieve the forever saves selection of the fan for a particular content provider from a database of a computer based forever saves system;
   access, periodically in an automatic manner, a plurality of content services using an application programming interface (API) and user access tokens for each content service, wherein each content service releases a plurality of new content for the particular content provider;
   determine that a new release of content created by the particular content provider has been released using a particular content service;
   purchase, in an automatic manner from the particular content service using the API and user access tokens for the particular content service, the determined new release of content created by the particular content provider; and
   deliver, in an automatic manner, the purchased new release of content created by the particular content provider to a content library of the fan.

12. The system of claim 11, wherein the computer based forever saves system is further configured to obtain one or more access tokens of the fan to access each content service and use the obtained one or more fan access tokens to access each of the plurality of content services.

13. The system of claim 12, wherein the computer based forever saves system is further configured to determine a location of the fan.

14. The system of claim 13, wherein the computer based forever saves system is further configured to perform a reverse geolocation using an IP address of the fan to determine the location of the fan.

15. The system of claim 13, wherein the computer based forever saves system is further configured to generate metrics about the new release using the location of the fan.

16. The system of claim 11, wherein the computer based forever saves system is further configured to verify that the new release is not a duplicate of content already stored in the database of the computer based forever saves system.

17. The system of claim 11, wherein the computer based forever saves system is further configured to obtain a link to the new release for each content service other than the particular content service.

18. The system of claim 11, wherein the computer based forever saves system is further configured to obtain a number of content identification lookups by a content identification lookup service for the new release.

19. The system of claim 11, wherein the content is one of music, movies and books.

20. The system of claim 11, wherein the content is music, the content provider is an artist and the plurality of content services are Apple® Music, Deezer® and Spotify®.

21. The method of claim 1, wherein the user access tokens include a user token and a refresh token.

22. The method of claim 1 further comprising receiving, by the computer based forever saves system, the user access tokens from each fan.

23. The system of claim 11, wherein the user access tokens include a user token and a refresh token.

24. The system of claim 11, wherein the computer based forever saves system is configured to receive the user access tokens from each fan.

* * * * *